Dec. 4, 1951　　B. W. BENBOW ET AL　　2,577,301
WIRE TIGHTENING DEVICE
Filed Aug. 7, 1950　　　　　　　　　　　2 SHEETS—SHEET 1
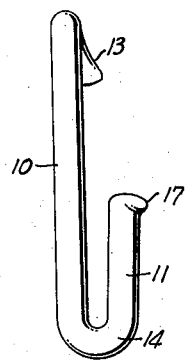
FIG_1_
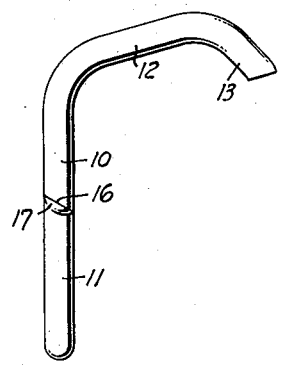
FIG_2_
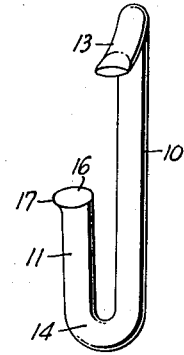
FIG_3_
FIG_4_　　FIG_6_　　FIG_7_
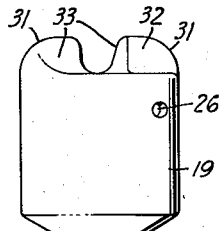
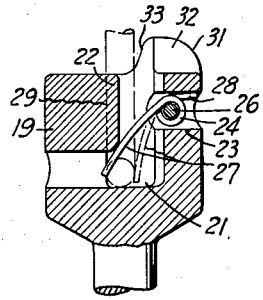
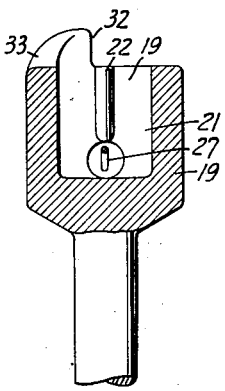
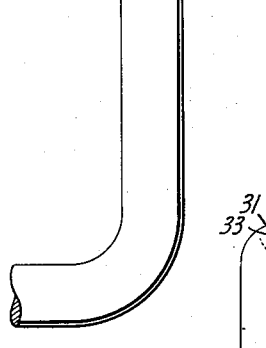
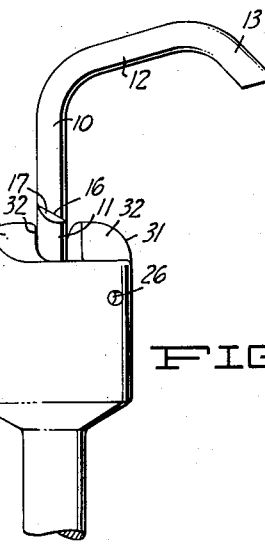
FIG_8_
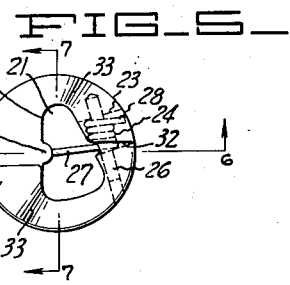
FIG_5_
INVENTORS
Burtis W. Benbow
Robert S. Benbow
BY
*Fisher and Swain*
ATTORNEYS Dec. 4, 1951  B. W. BENBOW ET AL  2,577,301
WIRE TIGHTENING DEVICE
Filed Aug. 7, 1950  2 SHEETS—SHEET 2
FIG_9_  FIG_10_  FIG_11_
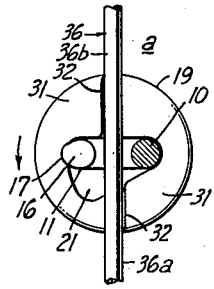 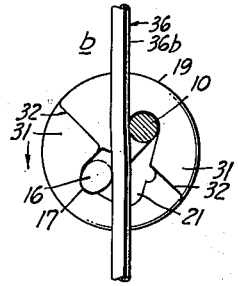 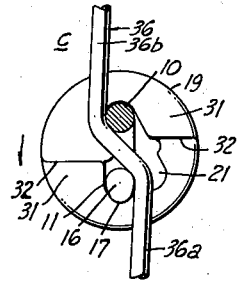
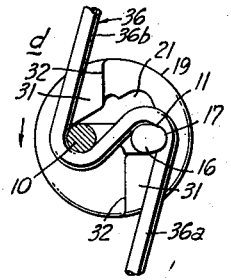 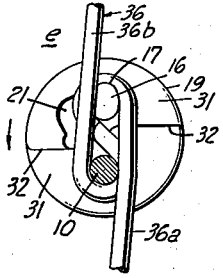 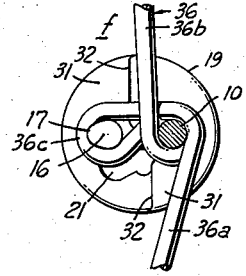
FIG_12_  FIG_13_  FIG_14.
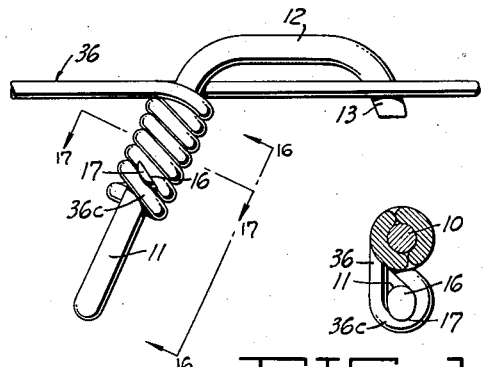
FIG_15_
FIG_16_
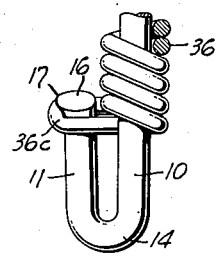
FIG_17_
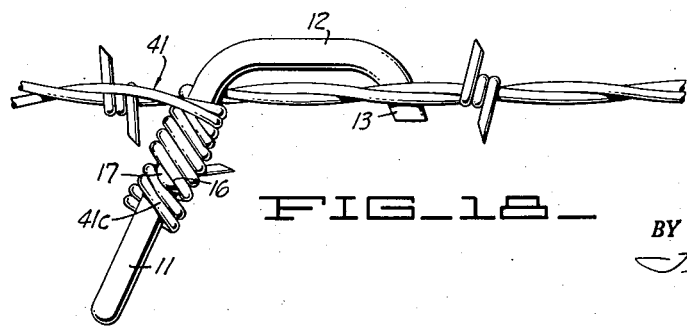
FIG_18_
INVENTORS
Burtis W. Benbow
Robert S. Benbow
BY
ATTORNEYS Patented Dec. 4, 1951

2,577,301

UNITED STATES PATENT OFFICE 2,577,301

WIRE TIGHTENING DEVICE

Burtis William Benbow and Robert S. Benbow, Benbow, Calif., assignors to Benbow Fence Tightener Co., Benbow, Calif., a corporation of California Application August 7, 1950, Serial No. 178,147

1 Claim. (Cl. 24—71.3)

This invention relates generally to devices for tightening wires, and particularly wires or strands such as are used in the construction of wire fences.

A commonly experienced difficulty with wire fences is the slackening or loosening of the horizontal wires or strands. A wide variety of devices have been proposed for tightening the wires, but because of various disadvantages they have not been widely used. In order to afford a successful solution to this problem such a device should be of extreme simplicity with respect to its construction, cost of manufacture and mode of operation. The mode of operation should be such that no particular skill is required and whereby strands can be tightened with a minimum amount of time, without injury to the wire and with positive retention after obtaining a desired degree of tightness.

It is an object of the present invention to provide a simple wire tightening device which will afford all of the advantages outlined above.

Another object of the invention is to provide a device of the above character which will facilitate initial engagement of the device with the wire and the commencement of a winding operation.

Another object of the invention is to provide a wire tightening device suitable for use with a tool such as disclosed herein, and as disclosed and claimed in the copending applications hereinafter identified.

Additional objects of the invention will appear from the following description in which the preferred embodiment has been set forth in detail in conjunction with the accompanying drawings.

Referring to the drawings:

Figures 1, 2 and 3 are side elevational views showing a tool incorporating the present invention, the device in Figure 2 being turned through 90° from the position of Figure 1, and being turned through 180° in Figure 3.

Figure 4 is a side elevational view showing a suitable tool for use with the device of Figures 1 to 3 inclusive.

Figure 5 is an end view of the device shown in Figure 4.

Figure 6 is a cross-sectional detail taken along the line 6—6 of Figure 5.

Figure 7 is a cross-sectional detail taken along the line 7—7 of Figure 5.

Figure 8 is a side elevational view showing the tool of Figure 4 with the winding device of Figures 1 to 3 inclusive applied to the same.

Figures 9 to 14 inclusive are end views of the winding tool with the winding device applied to the same, and serving to illustrate various stages in a winding operation.

Figure 15 is a plan view showing one of our devices after a winding operation, with the same being held from unwinding.

Figure 16 is a fragmentary view taken in the direction indicated by lines 16—16 of Figure 15.

Figure 17 is a cross-sectional detail taken along the line 17—17 of Figure 15.

Figure 18 is a view like Figure 15 showing use of the device on double strand barbed fencing wire.

The device as illustrated in Figures 1 to 3 inclusive preferably is formed of a single length of material of suitable strength such as galvanized steel wire of reasonable rigidity. This material is bent to provide a shank portion 10, an anchorage stud portion 11, an arm portion 12, and a portion 13 at the end of the arm portion. The shank and stud portions 10 and 11 are spaced apart to permit entrance of the wire to be tightened. The stud 11 is of a length substantially shorter than the length of the shank 10, for reasons to be presently explained. That portion 14 which connects the portions or branches 10 and 11, is adapted to be engaged by a winding tool. As viewed in Figure 2 the arm 12 preferably extends at an angle somewhat greater than 90° to the shank 10. In a typical instance this angle can be of the order of 110°. In addition it is preferable that the plane coincident with axes of the shank 10 and arm 12, be at right angles to a plane coincident with the axes of the shank 10 and the stud 11.

The hook portion 13 on the extremity of the arm 12 can be formed substantially as illustrated in Figures 1 to 3 inclusive. As shown particularly in Figure 3 this portion is bent in such a fashion that it is at a small angle of say 20 to 30° to a plane coincident with the axes of shank 10 and arm 12.

The end face 16 of the stud 11 is preferably on an angle somewhat as illustrated in Figures 1 to 3. Thus it conforms generally to a plane which is tilted to a plane normal to the axis of the stud, and which is at right angles to a plane coincident with the axes of shank 10 and arm 12. As illustrated in Figure 2 the angle of tilt in a typical instance can be of the order of from 20 to 40°. The free end of the stud 11 is also provided with a projection 17 which is on that side of the stud remote from the shank 10. This projection can be referred to as a hook-like portion, although in dimensioning it need be only of sufficient size to effectively retain a loop of wire.

Before describing the way in which the winding device is employed, it is necessary to describe a suitable winding tool such as the device illustrated in Figures 4 to 7 inclusive. The tool in this instance consists of a head 19 provided with a socket opening 21 dimensioned to receive the portion 14 of the winding device. The opening 21 is of such depth that when the winding device is seated within it, as shown in Figure 8, the stud 11 projects from the adjacent end of the head a sufficient distance to facilitate engagement of a wire as will be presently explained. The opening 21 in the head is substantially triangular in cross-sectional contour (Figure 5) and one vertical interface is provided with a locking rib 22. The head is also provided with a recess 23 which accommodates the coiled wire spring 24, and the retaining pin 26 which extends through the coil. One end of the wire spring is extended to form the finger 27. The other end 28 engages the head whereby the finger 27 is urged to the left as viewed in Figure 6.

When the portion 14 of the winding device is thrust into the opening 21 of the head 19, the finger 27 is deflected laterally to urge the winding device against the face 29, or in other words to the position illustrated in dotted lines in Figure 6. In this position it will be noted that the rib 22 is between the shank and the stud of the winding device, and thus serves to retain the winding device upon the head. Upon turning the head of the tool in a clockwise direction turning torque is applied to the winding device, and such torque likewise serves to press the winding device against the face 29. The winding device can be readily removed from the head by a slight amount of counterclockwise rotation of the tool relative to the winding device, which serves to disengage the winding device from the rib 22, to thereby permit the winding device to be withdrawn.

The end of the winding head is also provided with a pair of cam elements 31. These cam elements provide oppositely faced shoulders 32 together with oppositely sloped cam surfaces 33. The shoulders 32 can be located generally on opposite sides of a line passing through the center of the tool head, as illustrated in Figure 5. As illustrated particularly in Figure 8 when the winding device is seated within the winding tool, the free end of the anchoring stud 11 projects a short distance beyond the cam elements 31.

Operation of the winding device as illustrated in Figures 1 to 3 inclusive, making use of the tool of Figures 4 to 8 inclusive, is as follows: Assuming that the winding device is properly seated within a tool head, the head of the tool is positioned against the wire 36 to be tightened, with the wire extending between the cam shoulders 32, and between the shank and stud portions 10 and 11. This initial positioning of the parts relative to the wire is illustrated in Figure 9. The operator now commences to turn the tool in a clockwise direction. Assuming initial movement through about 45° as shown in Figure 10, one commences to apply bending to the wire, but the cam elements 31 are spaced from the wire and are not effective. After movement through 90° as shown in Figure 11, one has commenced to form a loop in the wire, and the cam elements 31 are still spaced from the wire. Figure 12 shows the position of the parts after movement through 180° from the position of Figure 9. A considerable part of the initial loop in the wire has been formed. The cam elements 31 are approaching a position in which they commence to act upon the wire. In turning a further 90° from the position shown in Figure 12, to that shown in Figure 13, the cam elements 31 act upon the extending lengths 36a, 36b of wire to thrust them forwardly, thus insuring that the next convolutions will be wound upon the shank 10. Further rotation from the position shown in Figure 13 to that of Figure 14 serves to complete the anchoring loop 36c, with the wire commencing to wind upon the shank 10. Now as one proceeds to turn the winding tool the two extending lengths 36a, 36b of the wire are wound in the form of a double threaded helix upon the shank 10, until the wire has been tightened to a desired degree. Thereafter the hook portion 13 of the arm 12 is engaged over one extending length of the wire and the winding tool is withdrawn, leaving the winding device attached to the wire as shown in Figure 15.

In the winding operations described above, the portion 17 serves an important function. As one proceeds through the operations illustrated in Figures 11, 12 and 13 the wire loop 36c must be held upon the stud 11 in close proximity with the free end of the same. This is made possible by the portion 17, which holds the anchoring loop upon the stud but in relatively close proximity to the stud face 16. The inclined stud face 16 is also desirable in that in proceeding through the stages shown in Figures 13 and 14, the inclined face facilitates clearance of the end of the stud 11 with respect to the extending length of wire 36b. In other words if there is a tendency for this extending length of wire to engage the end of the anchoring stud, there is a camming effect which permits the stud to pass the wire.

Reference has been made to the fact that the arm 12 preferably extends substantially at right angles to a plane coincident with the axes of the shank 10 and stud 11. This is desirable because it enables one to engage the arm 12 with a wire and to terminate a tightening operation, when the parts have been turned to provide only sufficient wrap about the shank to maintain the anchoring loop and have the wire embracing the shank. If one should extend the arm 12 in the same plane as that of the shank and stud, then it would be necessary to initially wrap a greater amount of wire on the shank before terminating the winding operation. In tightening wires under all conditions of slackness, it is desirable to have utmost flexibility with respect to the amount of wire to be initially wound upon the device, before it is detached from the winding tool.

In the foregoing description reference has been made to the tightening of single strand fence wire. A feature of the device is that it can be used on double strand fence wire, such as the common "barb" wire. Thus as shown in Figure 18 a double strand length of "barb" wire 41 has been wound upon the device, with an anchoring loop 41c being retained upon the stud 11.

It will be evident from the foregoing that our winding device is characterized by great mechanical simplicity, and it can be readily used by any unskilled workman in the tightening of wire strands of a fence. No difficulty is experienced in commencing a winding operation, or in completing the operation to the point of withdrawing the winding tool. If a wire to which a winding device has been attached subsequently should become slack, one can apply the winding tool and take up further wire, or additional devices can be applied, depending upon the extent of slackness.

Reference is made to our copending applications Serial No. 739,374 filed April 4, 1947 (now abandoned), Serial No. 764,130 filed July 28, 1947, and Serial No. 67,374 filed December 27, 1948 (now abandoned), all entitled "Wire Tightening Device," and of which this case is a continuation-in-part.

We claim:

In a wire tightening device, a body formed from a single length of metal, the metal being bent U-shaped to provide a portion made of two parallel branches for engaging a tool for turning the device about an axis parallel to the branches, one of said branches forming a winding shank and the other of said branches being substantially shorter than the first branch and forming an anchoring stud, said stud being formed with a projection on its extremity for engaging and retaining a wire loop, said projection extending laterally from said stud in a direction away from said shank, said stud and projection having an end face thereacross defining a plane which is at an angle of less than 90° with respect to the general plane of said two branches, and a retaining arm extending laterally from the shank portion, the extremity of said retaining arm being provided with a portion adapted to engage one side of a length of wire to prevent unwinding from the shank, said end face of said stud forming a camming surface for engaging a wire during turning of the device in a wire tightening operation to direct convolutions of the wire upon the winding shank.

BURTIS WILLIAM BENBOW.
ROBERT S. BENBOW.

REFERENCES CITED

The following references are of record in the file of this patent:

UNITED STATES PATENTS

| Number | Name | Date |
|---|---|---|
| 2,086,317 | Hunt | July 6, 1937 |

FOREIGN PATENTS

| Number | Country | Date |
|---|---|---|
| 341,088 | France | June 1, 1904 |
| 507,909 | France | July 9, 1920 |